(12) United States Patent
Boni et al.

(10) Patent No.: US 9,828,193 B2
(45) Date of Patent: Nov. 28, 2017

(54) METHOD FOR STACKING WELDED TUBE

(71) Applicant: Carego Innovative Solutions Inc., Burlington (CA)

(72) Inventors: Martin Boni, Burlington (CA); Robert Edwards, Burlington (CA)

(73) Assignee: Carego Innovative Solutions, Inc. (CA)

(*) Notice: Subject to any disclaimer, the term of this patent is extended or adjusted under 35 U.S.C. 154(b) by 0 days.

(21) Appl. No.: 15/311,094

(22) PCT Filed: Apr. 30, 2015

(86) PCT No.: PCT/CA2015/050366
§ 371 (c)(1),
(2) Date: Nov. 14, 2016

(87) PCT Pub. No.: WO2015/172242
PCT Pub. Date: Nov. 19, 2015

(65) Prior Publication Data
US 2017/0081136 A1 Mar. 23, 2017

Related U.S. Application Data

(60) Provisional application No. 61/993,391, filed on May 15, 2014.

(51) Int. Cl.
*G06F 7/00* (2006.01)
*B65G 57/18* (2006.01)

(52) U.S. Cl.
CPC ...... *B65G 57/18* (2013.01); *B65G 2201/0276* (2013.01)

(58) Field of Classification Search
USPC ........................................ 700/214
See application file for complete search history.

(56) References Cited

U.S. PATENT DOCUMENTS

| 4,503,978 A | 3/1985 | Smit et al. |
| 4,642,017 A | 2/1987 | Fenn |

(Continued)

FOREIGN PATENT DOCUMENTS

| CA | 1072919 | 3/1980 |
| CA | 2584306 | 3/2007 |

(Continued)

OTHER PUBLICATIONS

Tsafaridis, Demetrius; Non-final Office Action for U.S. Appl. No. 14/395,203, filed Oct. 17, 2014, dated Feb. 27, 2017, 11 pgs.

(Continued)

*Primary Examiner* — Kyle Logan
(74) *Attorney, Agent, or Firm* — Taylor English Duma LLP

(57) ABSTRACT

The method involves a pipe bundle arrangement, each bundle having a length, a width and a depth and being a shape bundle having a rectangular or a round bundle having a hexagonal cross-section. Each bundle has a type, each type having predetermined ranges of length and width, the bundle being assigned to that type in respect of which the length and width falls within the predetermined ranges. In the arrangement: no stack exceeds a predetermined height; no round bundle has stacked thereupon a shape bundle nor a round bundle of another type; the predetermined length range of each bundle in a stack is common; the predetermined width range of each shape bundle in a stack is common; and in no stack is a round bundle stacked upon a shape bundle wherein the predetermined width range of the round bundle is greater than the predetermined width range of the shape bundle.

22 Claims, 12 Drawing Sheets

(56) References Cited

U.S. PATENT DOCUMENTS

| | | | |
|---|---|---|---|
| 4,796,209 | A | 1/1989 | Burk |
| 9,522,783 | B2 | 12/2016 | Boni et al. |
| 2005/0226713 | A1 | 10/2005 | Tsafaridis |
| 2006/0104800 | A1 | 5/2006 | Armbruster |
| 2007/0007354 | A1 | 1/2007 | Mueller |
| 2007/0039909 | A1 | 2/2007 | DeMent |
| 2008/0255699 | A1 | 10/2008 | Hama et al. |
| 2011/0315765 | A1 | 12/2011 | Schantz et al. |
| 2012/0179632 | A1 | 7/2012 | Pienta et al. |
| 2015/0166272 | A1* | 6/2015 | Pankratov ............ G06Q 10/043 700/217 |
| 2015/0232274 | A1 | 8/2015 | Tsafaridis |
| 2015/0298907 | A1 | 10/2015 | Boni |

FOREIGN PATENT DOCUMENTS

| | | | | |
|---|---|---|---|---|
| CA | 2795624 | | 5/2014 | |
| CA | 2802429 | | 7/2014 | |
| CA | 2807309 | | 7/2014 | |
| DE | 202005020657 | | 5/2006 | |
| DE | 202005020657 | U1 * | 5/2006 | ......... B65D 71/0096 |
| EP | 0659660 | | 6/1995 | |
| EP | 1577231 | | 9/2005 | |
| EP | 1577231 | A1 * | 9/2005 | ......... B65D 71/0092 |
| FR | 2669904 | | 6/1992 | |
| JP | 2000255785 | | 9/2000 | |
| JP | 2008195535 | | 8/2008 | |
| WO | 0214203 | | 2/2002 | |
| WO | 2008119885 | | 10/2008 | |
| WO | 2011131836 | | 10/2011 | |
| WO | 2013059366 | | 4/2013 | |
| WO | 2014066976 | | 5/2014 | |
| WO | 2014066989 | | 5/2014 | |

OTHER PUBLICATIONS

Tsafaridis, Demetrius; Final Office Action for U.S. Appl. No. 14/395,203, filed Oct. 17, 2014, dated Sep. 12, 2016, 5 pgs.

Tsafaridis, Demetrius; International Preliminary Report on Patentability for PCT/CA2013/000329, filed Apr. 5, 2013, dated May 5, 2015, 7 pgs.

Tsafaridis, Demetrius; International Search Report and Written Opinion for PCT/CA2013/000329, filed Apr. 5, 2013, dated Jul. 18, 2013, 4 pgs.

Tsafaridis, Demetrius; Non-Final Office Action for U.S. Appl. No. 14/395,203, filed Oct. 17, 2014, dated Mar. 28, 2016, 15 pgs.

Tsafaridis, Demetrius; Restriction Requirement for U.S. Appl. No. 14/395,203, filed Oct. 17, 2014, dated Dec. 30, 2015, 6 pgs.

Tsafaridis, Demetrius; U.S. Provisional Application entitled: Warehouse-Related Method, having U.S. Appl. No. 61/721,865, filed Nov. 2, 2012, 39 pgs.

Boni, Martin; International Preliminary Report on Patentability for PCT/CA2013/000935, filed Nov. 1, 2013, dated May 5, 2015, 7 pgs.

Boni, Martin; International Search Report and Written Opinion for PCT/CA2013/000935, filed Nov. 1, 2013, dated Feb. 18, 2014, 5 pgs.

Boni, Martin; Issue Notification for U.S. Appl. No. 14/395,206, filed Oct. 17, 2014, dated Nov. 30, 2016, 1 pg.

Boni, Martin; Non-Final Office Action for U.S. Appl. No. 14/395,206, filed Oct. 17, 2014, dated Apr. 20, 2016, 19 pgs.

Boni, Martin; Notice of Allowance for U.S. Appl. No. 14/395,206, filed Oct. 17, 2014. dated Aug. 22, 2016, 10 pgs.

Boni, Martin; Restriction Requirement for U.S. Appl. No. 14/395,206, filed Oct. 17, 2014, dated Feb. 16, 2016, 6 pgs.

Boni, Martin; U.S. Provisional Application entitled: Warehouse-Related Method and Facility, having U.S. Appl. No. 61/835,800, filed Jun. 17, 2013, 52 pgs.

Boni, Martin; U.S. Provisional Application entitled: Warehouse-Related Method and Facility, having U.S. Appl. No. 61/897,289, filed Oct. 30, 2013, 49 pgs.

Boni, Martin; International Preliminary Report on Patentability for PCT Application No. PCT/CA2015/050366, filed Apr. 30, 2015, dated Nov. 15, 2016, 4 pgs.

Boni, Martin; International Search Report and Written Opinion for PCT Application No. PCT/CA2015/050366, filed Apr. 30, 2015, dated Jul. 16, 2015, 6 pgs.

Carego Innovative Solutions, Inc.; Extended European Search Report for serial No. 13851586.1, filed Jan. 1, 2013, dated Sep. 26, 2016, 12 pgs.

Tsafaridis, Demetrius; Final Office Action for U.S. Appl. No. 14/395,203, filed Oct. 17, 2014, dated Jun. 6, 2017, 5 pgs.

Tsafaridis, Demetrius; Non-Final Office Action for U.S. Appl. No. 14/395,203, filed Oct. 17, 2014, dated Mar. 17, 2017, 15 pgs.

* cited by examiner

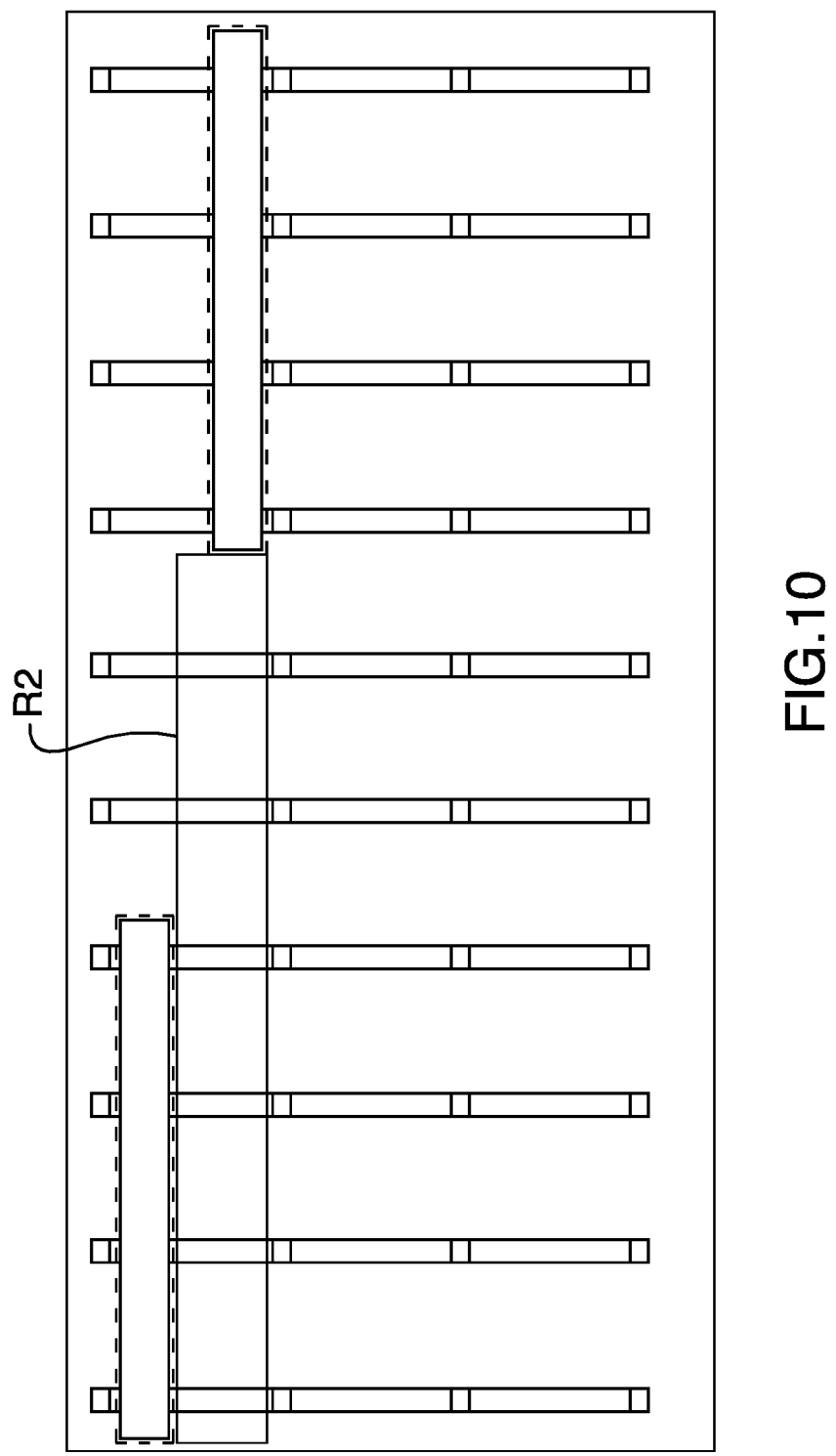

METHOD FOR STACKING WELDED TUBE

CROSS-REFERENCE TO RELATED APPLICATIONS

This application is a U.S. National Stage application of International PCT Application No. PCT/CA2015/050366, filed Apr. 30, 2015, which claims the benefit of U.S. Provisional Patent Application Ser. No. 61/993,391, filed May 15, 2014.

FIELD OF THE INVENTION

The invention relates to the field of warehousing.

BACKGROUND OF THE INVENTION

In modern commerce, there exists a need to warehouse bundled pipe. There also exists a desire to handle warehousing through automation. The geometry, mass and variations therein render the automation of bundled pipe handling difficult, particularly in the context of magnetic lifting operations.

SUMMARY OF THE INVENTION

Forming one aspect of the invention is an arrangement of a plurality of bundles of pipes in a storage area having a rectilinear polygonal floor surface. Each bundle has a length, a width and a depth and is either a shape bundle having a rectangular cross-section or a round bundle having a hexagonal cross-section. The arrangement is characterized: (i) in that each bundle is assigned to one of a plurality of types, each type having a predetermined length range and a predetermined width range, the bundle being assigned to that type in respect of which the width of the bundle falls within the predetermined width range and the length of the bundle falls within the predetermined length range; and (ii) by compliance with a rule set.

The rule set prescribes that: no stack of bundles may exceed a predetermined height; no round bundle may have stacked thereupon a shape bundle; no round bundle may have stacked thereupon a round bundle of another type; the predetermined length range of each bundle in a stack is common; the predetermined width range of each shape bundle in a stack is common; and no stack may include a round bundle stacked upon a shape bundle wherein the predetermined width range of the round bundle is greater than the predetermined width range of the shape bundle.

The arrangement and storage area can be used, along with a further bundle of pipes of the type having a length, a width and a depth and being either a shape bundle having a rectangular cross-section or a round bundle having a hexagonal cross-section, in a method which forms another aspect of the invention.

The method comprises the steps of:
assigning the bundle to that type in respect of which the width of the bundle falls within the predetermined width range and the length of the bundle falls within the predetermined length range; and
placing the bundle: (i) on another bundle in the storage area, if placement would not result in a violation of a rule set; or (ii) on the floor surface, if placement would otherwise result in a violation of the rule set.

According to another aspect of the invention, the rule set can further prescribe that no stack can exceed a predetermined number of bundles.

According to another aspect of the invention, the rule set can further prescribe that no round bundle can be stacked upon a shape bundle.

According to another aspect of the invention, the rule set can permit a round bundle to be stacked upon a shape bundle provided that at least a predetermined minimum number of round bundles of the same type could be stacked upon the shape bundle without exceeding the predetermined height and no more than a predetermined maximum number of round bundles of the same type could be stacked upon the shape bundle without exceeding the predetermined height.

According to another aspect of the invention, the predetermined minimum number can be two and the predetermined maximum number is three.

According to another aspect of the invention, in the method, if a round bundle could be placed upon more than one stack without violation of the rule set, the round bundle can be placed, in descending order of preference:
  upon a round bundle of the same type;
  upon a shape bundle of the same type; and
  upon a shape bundle having the same predetermined length range and a larger predetermined width range.

According to another aspect of the invention, the rule set can further prescribe that, in respect of each bundle placed upon the floor surface, said each bundle and any bundles stacked thereupon shall be centrally disposed with respect to a notional rectangular column having a length equal to the maximum length of the predetermined range of the bundle placed upon the floor and a width equal to the maximum width of the predetermined range of the bundle placed upon the floor.

According to another aspect of the invention, the rule set can further prescribe that no notional rectangular column may be within a predetermined distance of another notional rectangular column.

According to another aspect of the invention, the rule set can further prescribe that bundles are placed such that all of the pipes are parallel to one another.

According to another aspect of the invention, the bundle can be placed upon the floor surface such that, of a plurality of possible positions on the floor surface wherein the bundle could be placed without violation of the rule set, the space surrounding the bundle is minimized, such space being defined, in respect of each possible position of the bundle, by that area of the floor surface lying between the notional rectangular column of the bundle and the largest rectangle that can be defined wholly on the floor surface that surrounds the bundle, does not intersect any other rectangular column and has dimensions parallel to those of the rectangular columns.

According to another aspect of the invention, the plurality of possible positions can be all possible positions.

According to another aspect of the invention, the plurality of possible positions can be a plurality of positions regularly spaced apart from one another.

According to another aspect of the invention, the positions can be spaced apart lengthwise a distance equal to the nominal differential in lengths between bundle types and spaced apart widthwise a distance equal to the width variance of each bundle.

According to another aspect of the invention, in the method:
in respect of each point,
  a first line can be extended parallel to one of the dimensions from the point until such time as the line reaches the edge of the surface or a notional column associated with another bundle, and thereafter widened in directions parallel to the other dimension until such time as the first line reaches the edges of the surface or a notional column associated with another bundle;

a first rectangle can be defined by the perimeter of the first (widened) line;

a second line can be extended parallel to the other of the dimensions from the point until such time as the line reaches the edge of the surface or a notional column associated with another bundle and thereafter be widened in directions parallel to the one dimension until such time as the line reaches the edge of the surface or a notional column associated with another bundle;

a second rectangle can be defined by the perimeter of the second (widened) line;

if the length and width of the first rectangle are larger than the length and width of the type of the bundle to be placed, the ratio of the area of the type to the ratio of the first rectangle can be calculated; and if the length and width of the second rectangle are larger than the length and width of the type of the bundle to be placed the ratio of the area of the type to the ratio of the second rectangle can be calculated;

the highest calculated ratio can be selected; and in the event that: (i) only one of the calculations resulted in the selected ratio, the bundle can be placed within that rectangle that resulted in the selected ratio; and (ii) a plurality of the calculations resulted in the selected ratio, the bundle can be placed within the rectangle that resulted in the selected ratio and is nearest a predetermined point.

According to another aspect of the invention, the bundle can be placed in a corner of the rectangle within which the bundle is placed.

Advantages, features and characteristics of the invention will become evident upon a review of the following detailed description, the accompanying claims and the appended drawings, the latter being briefly described hereinafter.

BRIEF DESCRIPTION OF THE DRAWINGS

FIG. 10 shows the line of FIG. 10 widened into the second rectangle R2 for point $P^s$

DETAILED DESCRIPTION OF THE ARRANGEMENT AND THE METHOD

Background

Figure 1:
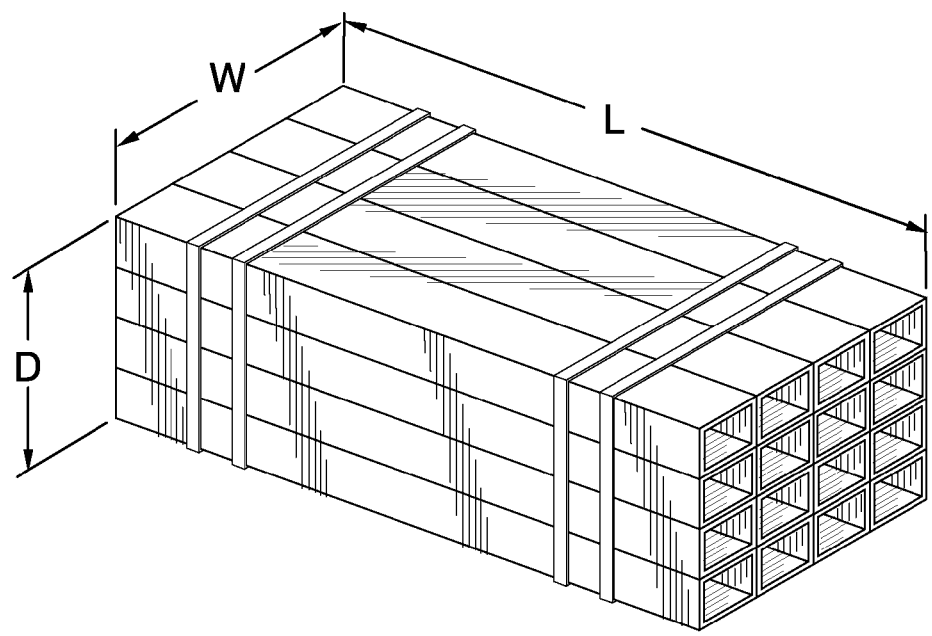
FIG. 1 shows a prior art bundle having a rectangular cross section
Figure 2:
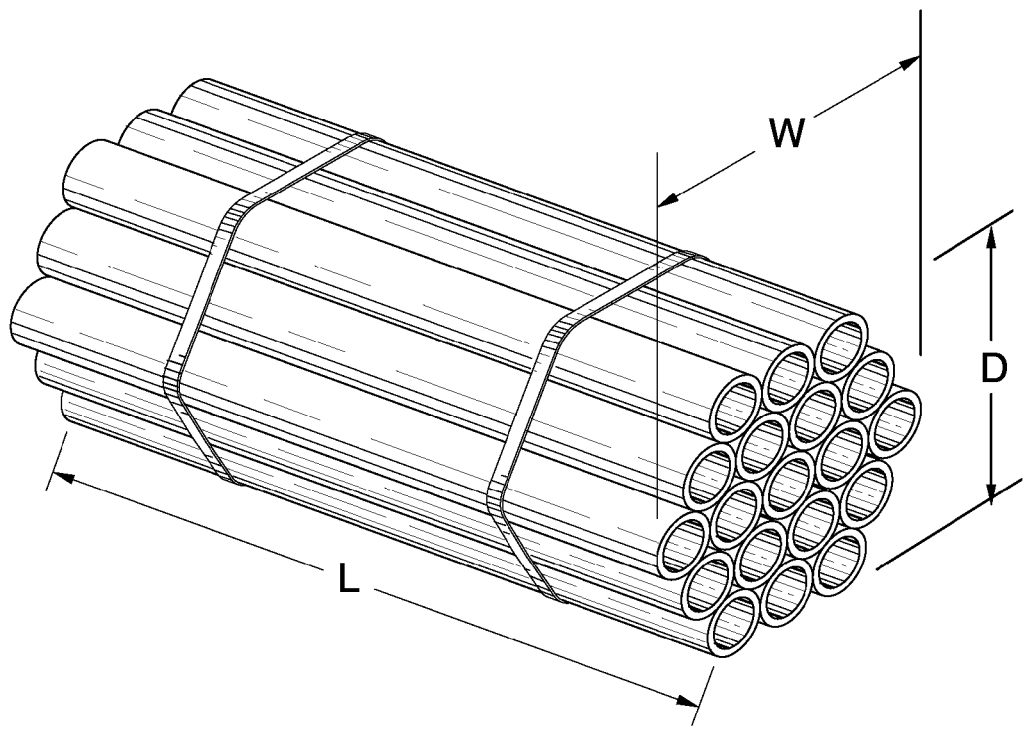
FIG. 2 shows a prior art bundle having an hexagonal cross section
Figure 3:
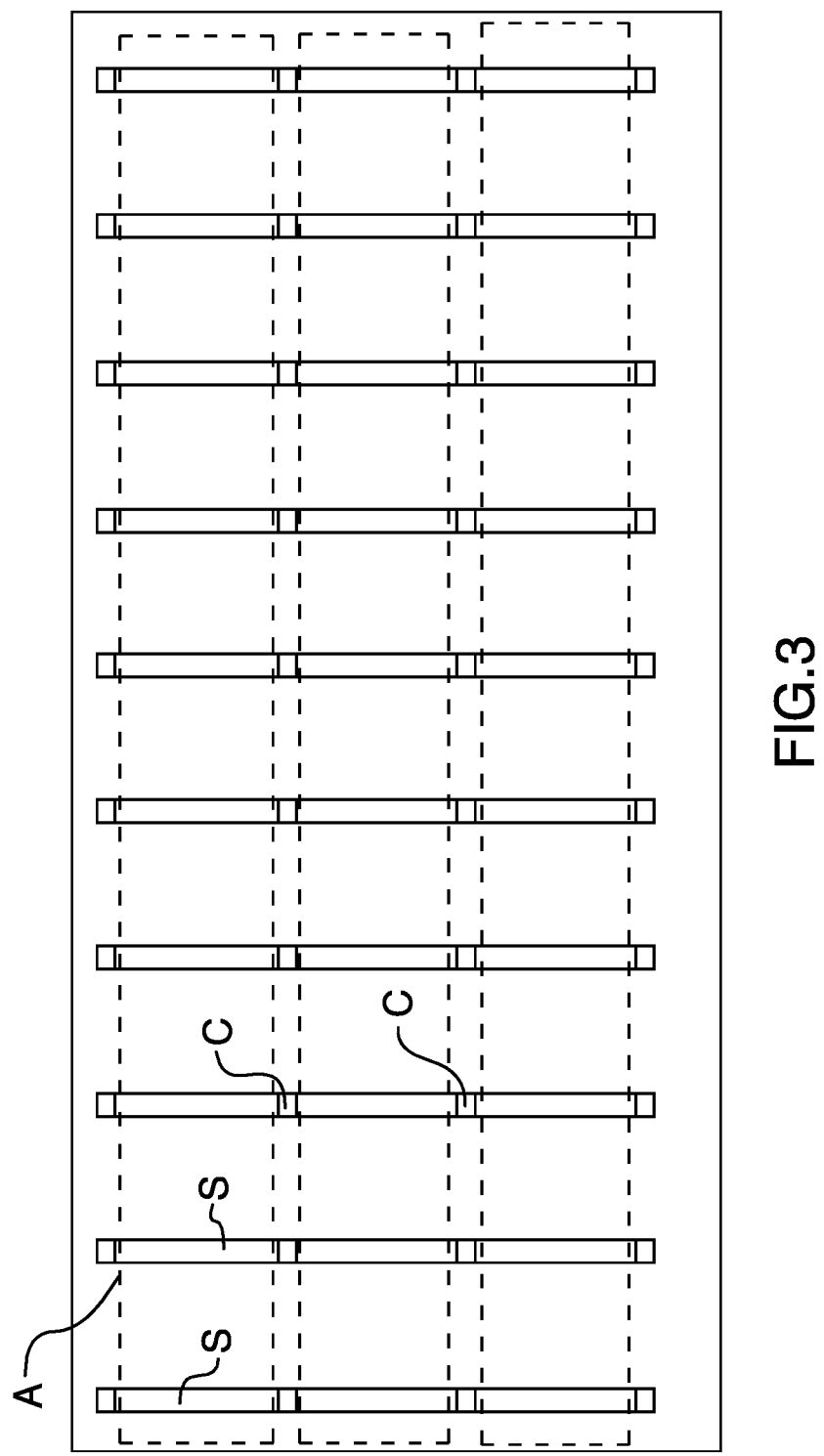
FIG. 3 shows an exemplary storage area in plan view

As an initial matter, the inventive arrangement will be understood to be for use with bundles of pipes and a storage area. In the exemplary embodiment:

each bundle of pipes is well known in the prior art and has a length L, a width W and a depth D and is either a shape bundle having a rectangular cross-section as shown in FIG. 1 or a round bundle having a hexagonal cross-section as shown in FIG. 2; and the storage area is of the type having a rectilinear polygonal floor surface A, as is shown in FIG. 3

The floor surface A is FIG. 3 is actually defined by a plurality of steel sleepers S to which is welded a plurality of steel columns C. It will be understood that storage areas with floor surfaces of this type are known in the prior art and form no part of the invention.

Arrangement

The arrangement is characterized: (i) in that each bundle is assigned to one of a plurality of types, each type having a predetermined length range and a predetermined width range, the bundle being assigned to that type in respect of which the width of the bundle falls within the predetermined width range and the length of the bundle falls within the predetermined length range; and (ii) by compliance with a rule set.

In the exemplary embodiment, the lengths of the types are defined in the following increments (inches):

| MIN | MAX |
|---|---|
| 216 | 239.988 |
| 240 | 251.988 |
| 252 | 288 |
| 288.012 | 335.988 |
| 336 | 383.988 |
| 384 | 431.988 |
| 432 | 479.988 |
| 480 | 528 |
| 528.012 | 540 |
| 540.012 | 575.988 |
| 576 | 624 |
| 624.012 | 672 |
| 672.012 | 722 | and the widths in the following increments (inches)

| ROUND MIN | MAX | SHAPE MIN | MAX |
|---|---|---|---|
| 12 | 13 | 7 | 9 |
| 13 | 14 | 9 | 11 |
| 14 | 15 | 11 | 13 |
| 15 | 16 | 13 | 15 |
| 16 | 7 | 15 | 17 |
| 17 | 8 | 17 | 19 |
| 18 | 19 | 19 | 21 |
| 19 | 20 | 21 | 23 |
| 20 | 21 | 23 | 25 |
| 21 | 22 | | |
| 22 | 23 | | |
| 23 | 25 | | |
| 25 | 27 | | |
| 27 | 29 | | |

The rule set prescribes that: no stack of bundles may exceed a predetermined height; no round bundle may have stacked thereupon a shape bundle; no round bundle may have stacked thereupon a round bundle of another type; the predetermined length range of each bundle in a stack is common; the predetermined width range of each shape bundle in a stack is common; and no stack may include a round bundle stacked upon a shape bundle wherein the predetermined width range of the round bundle is greater than the predetermined width range of the shape bundle.

Figure 4:
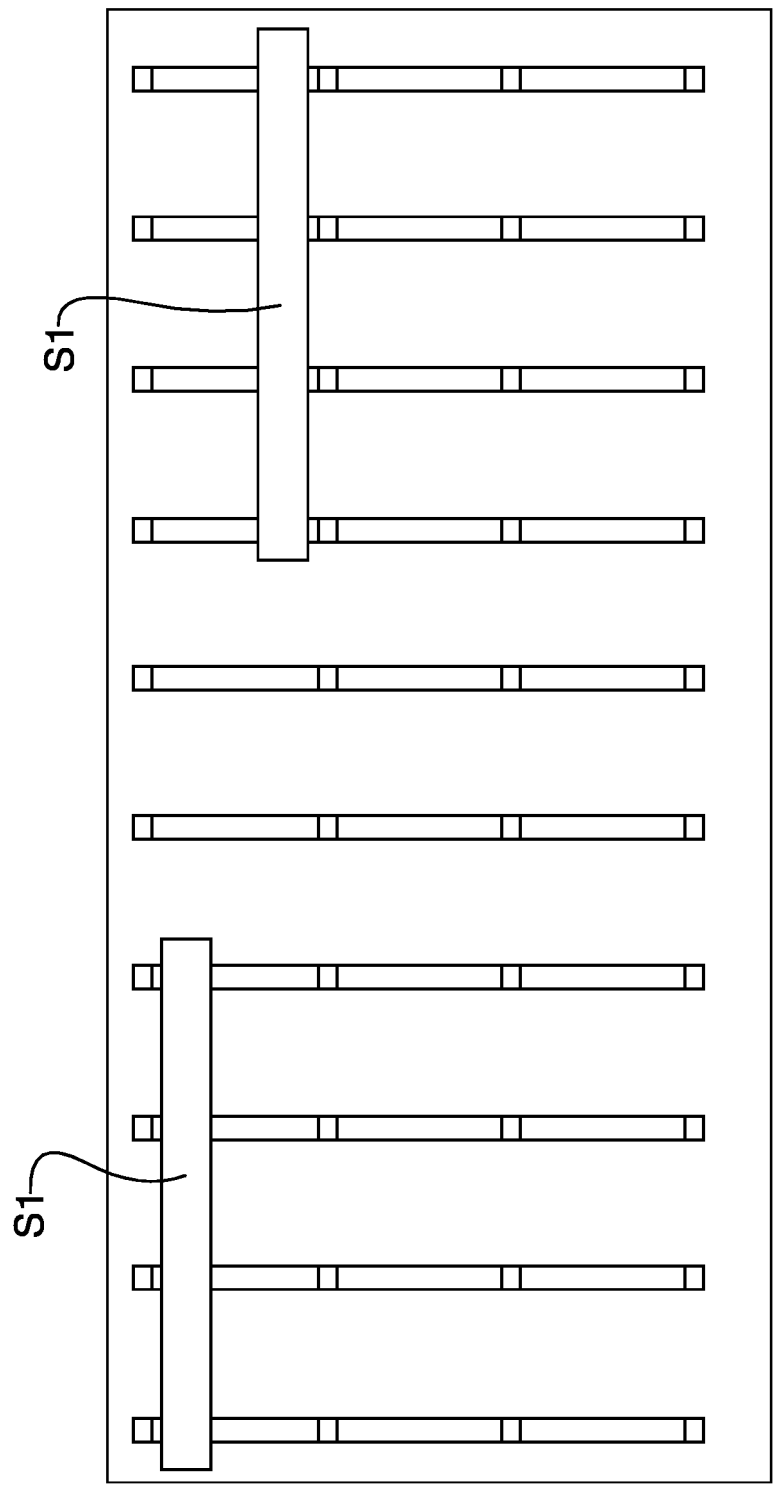
FIG. 4 shows an arrangement of bundles in the storage area of FIG. 3

An exemplary arrangement is shown in FIG. 4. In this arrangement, two stacks S1 and S2 are shown.

Stack S1 consists of two bundles: a lower bundle, disposed upon the floor surface, that is a shape bundle having a length of 21'6" and a width of 18"; and an upper bundle, disposed upon the lower bundle, that is a shape bundle having a length of 21'3" and a width of 18".

Stack S2 consists of two bundles: a lower bundle, disposed upon the floor surface, that is a shape bundle having a length of 21'9" and a width of 20"; and an upper bundle, disposed upon the lower bundle, that is a round bundle having a length of 21'6" and a width of 18".

Method

The arrangement and storage area can be used, along with a further bundle of pipes of the type having a length, a width and a depth and being either a shape bundle having a rectangular cross-section or a round bundle having a hexagonal cross-section, in a method that comprises an assignment step and a placement step.

In the assignment step, the bundle is assigned to that type in respect of which the length of the bundle falls within the predetermined length range and the width of the bundle falls within the predetermined width range.

The placement step involves:
(i) placement of the bundle on another bundle in the storage area, if placement would not result in a violation of a rule set; or
(ii) on the floor surface, if placement of the bundle on another bundle cannot be carried out otherwise than in violation of the rule set.

The exemplary rule set prescribes various rules regarding (i), namely:
no stack of bundles may exceed a predetermined height, specifically 12'
no round bundle may have stacked thereupon a shape bundle;
no round bundle may have stacked thereupon a round bundle of another type;
the predetermined length range of each bundle in a stack is common;
the predetermined width range of each shape bundle in a stack is common;
no stack may include a round bundle stacked upon a shape bundle wherein the predetermined width range of the round bundle is greater than that of the shape bundle
no stack can exceed a predetermined number of bundles, specifically, five (5)
a round bundle to be stacked upon a shape bundle provided that at least a predetermined minimum number (2) of round bundles of the same type could be stacked upon the shape bundle without exceeding the predetermined height and no more than a predetermined maximum number (3) of round bundles of the same type could be stacked upon the shape bundle without exceeding the predetermined height
if a round bundle could be placed upon more than one stack without violation of the rule set, the round bundle is placed, in descending order of preference: (i) upon a round bundle of the same type; (ii) upon a shape bundle of the same type; and (iii) upon a shape bundle having the same predetermined length range and a larger predetermined width range.

Thus, in the context of the arrangement shown in FIG. 2, a bundle of the type shown in FIG. 2 having a length of 21'4" and a width of 18" could be placed upon either stack S1 or S2.

Figure 5:
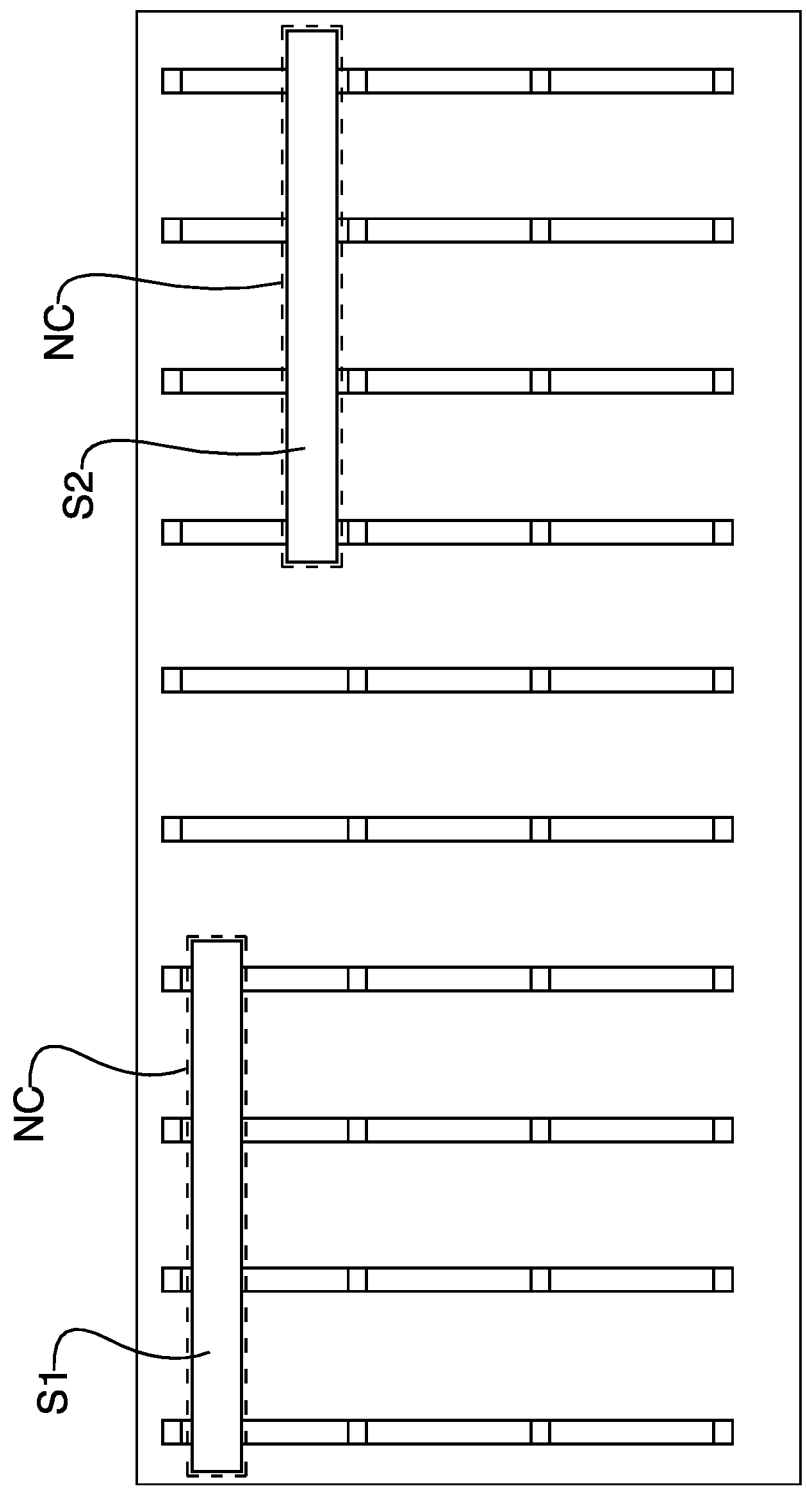
FIG. 5 shows the structure of FIG. 4 with the notional columns superimposed
Figure 6:
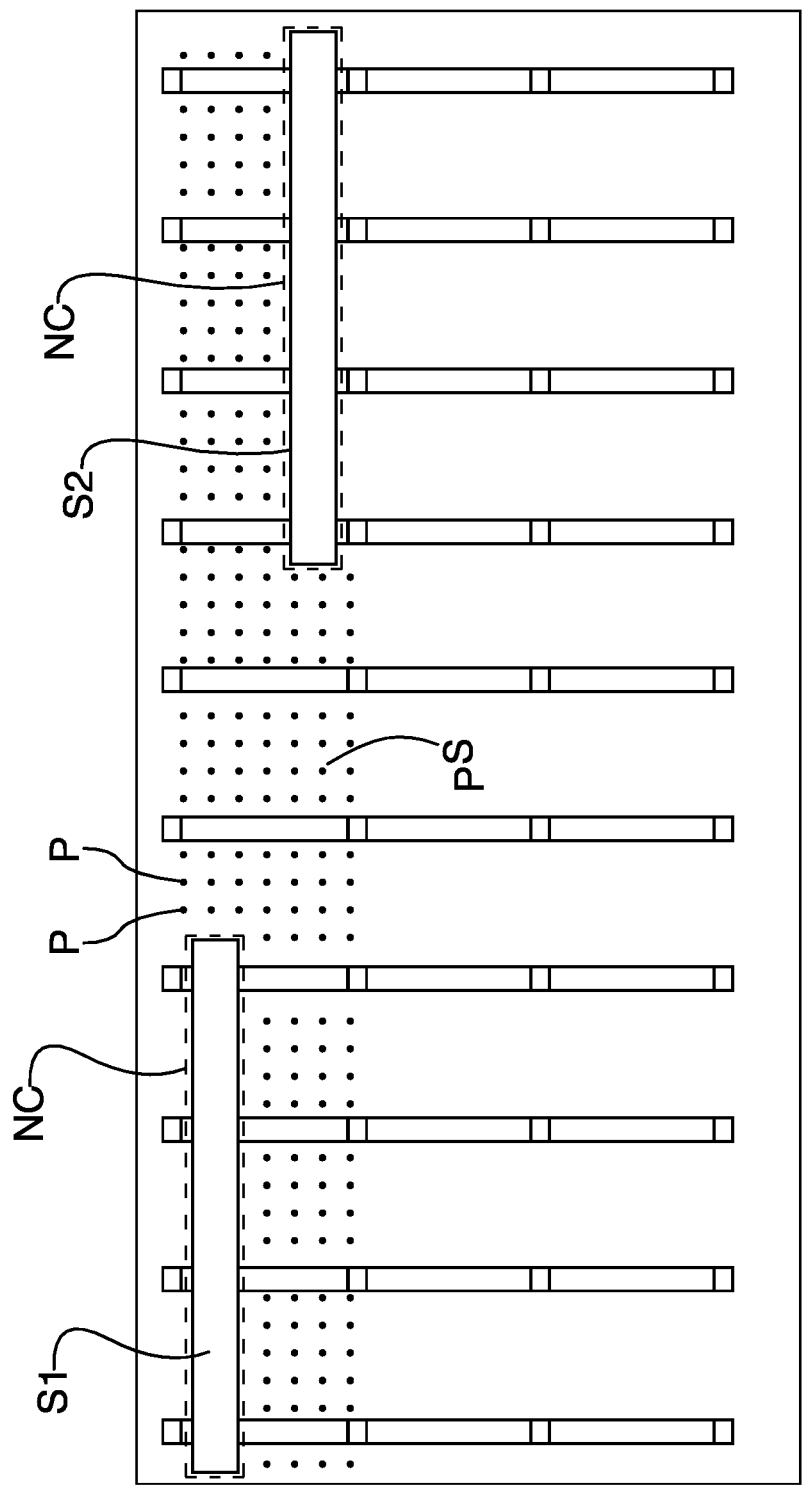
FIG. 6 shows the structure of FIG. 5 with a plurality of points P defined therein and point Ps
Figure 7:
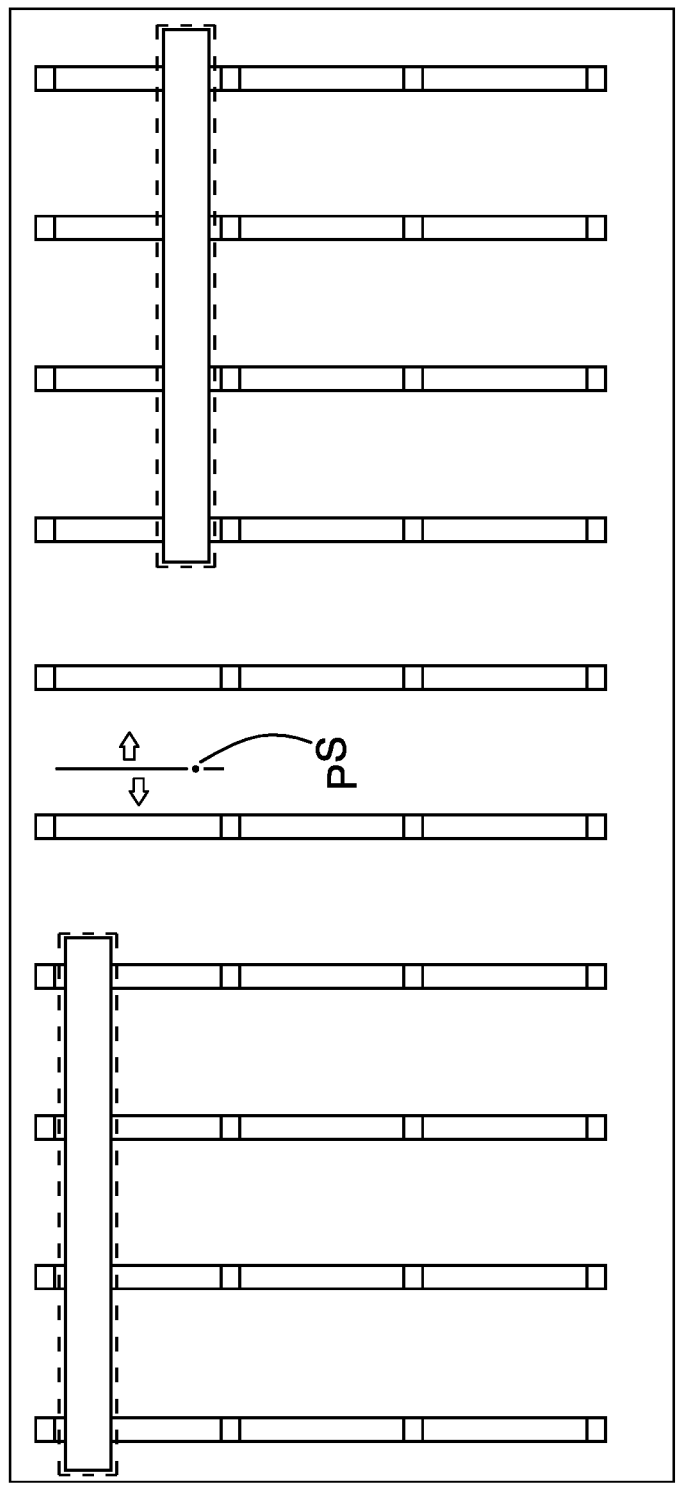
FIG. 7 shows a line drawn through $P^s$
Figure 8:
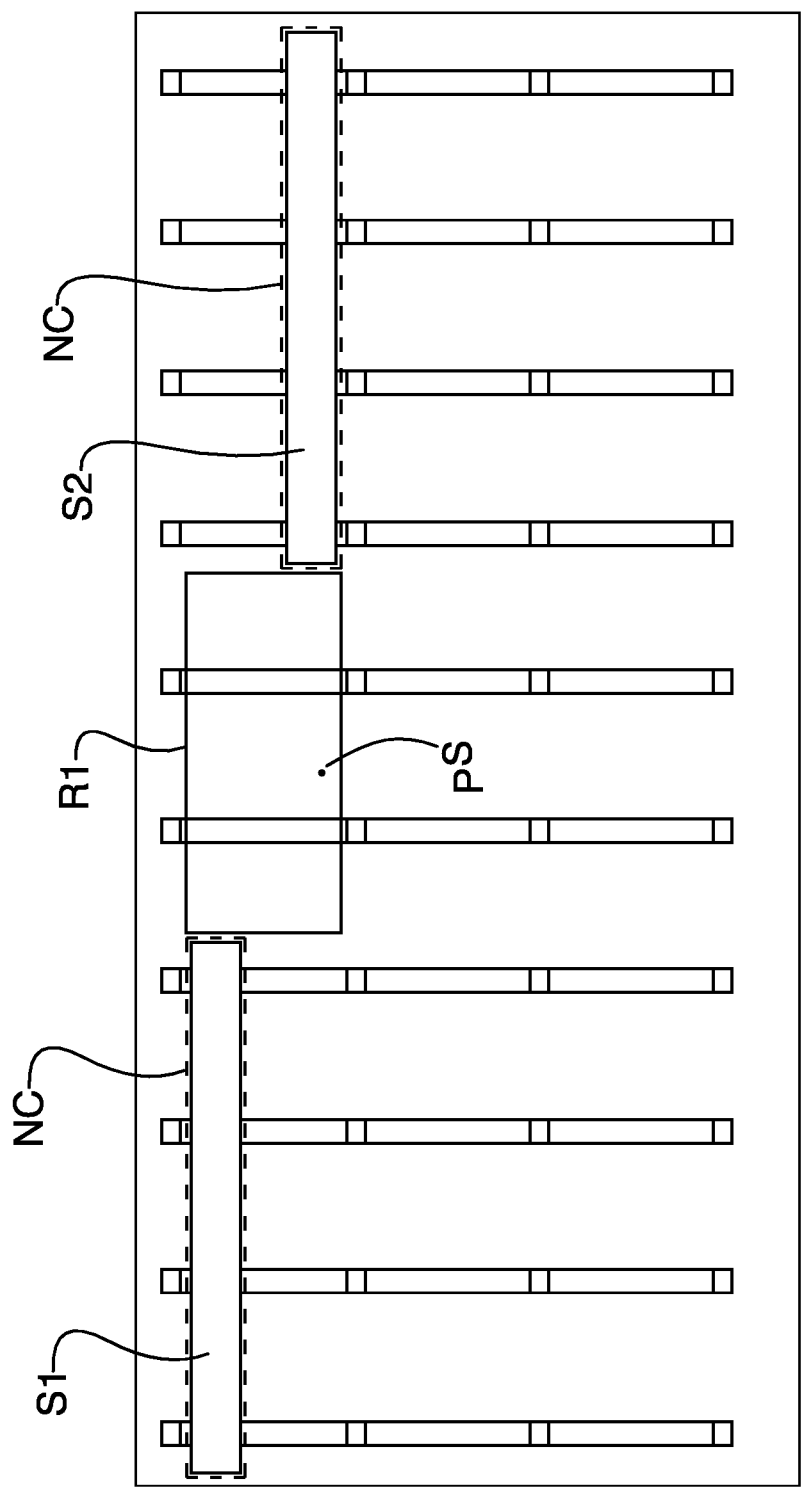
FIG. 8 shows the line of FIG. 7 widened into a first rectangle R1 for point $P^s$
Figure 9:
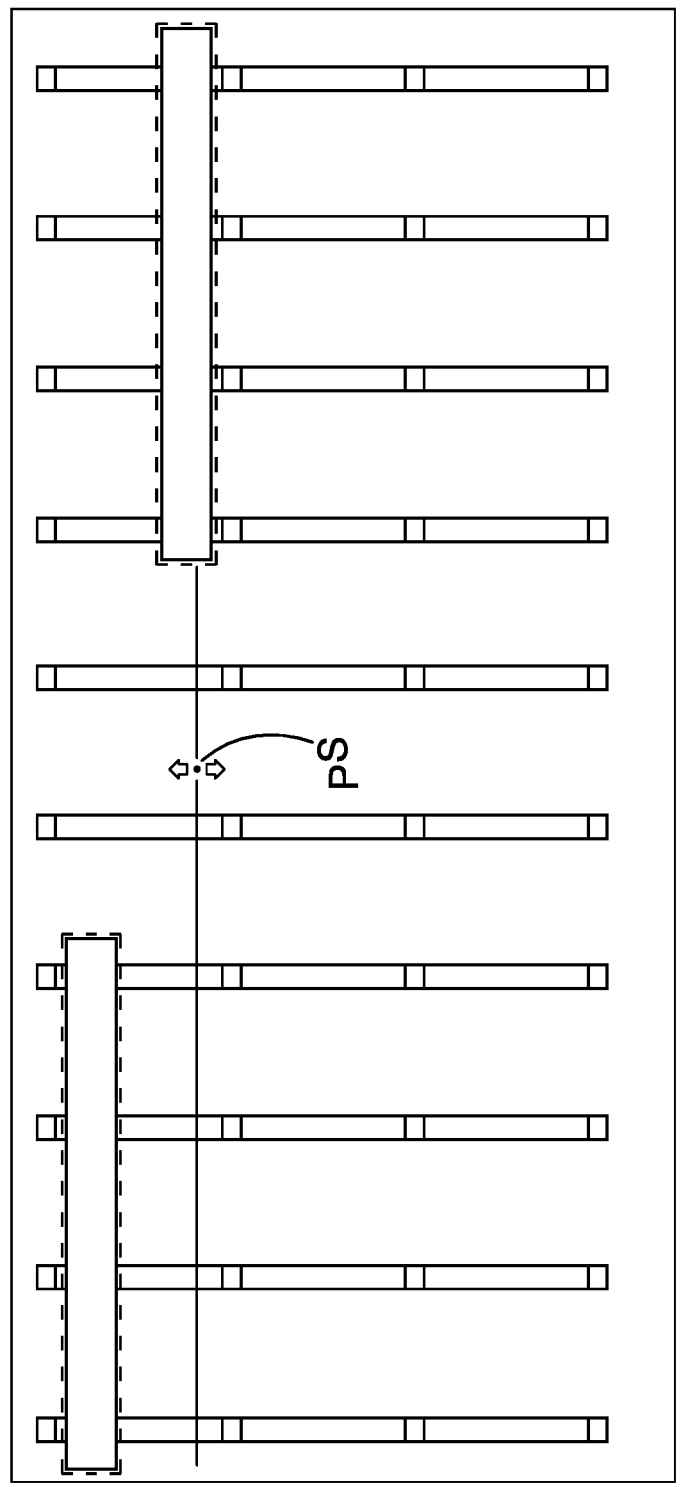
FIG. 9 shows another line drawn through $P^s$
Figure 11A:
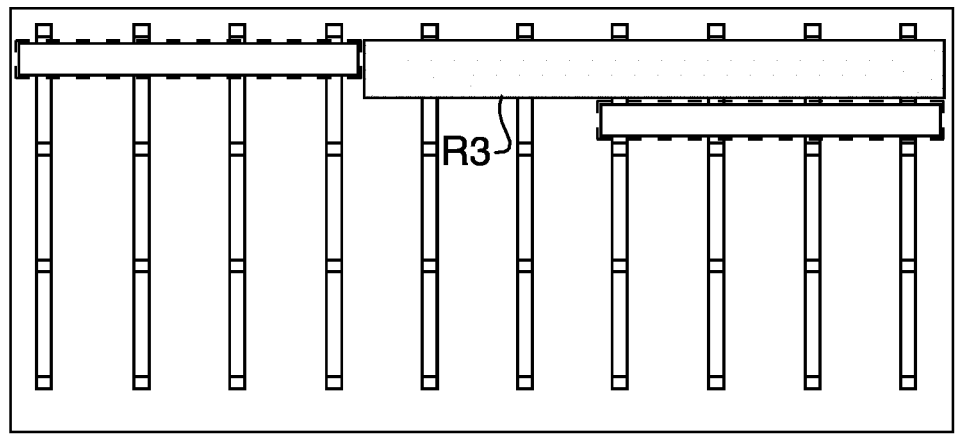
FIG. 11A-C shows the rectangles possible for the structure of FIG. 4
Figure 11B:
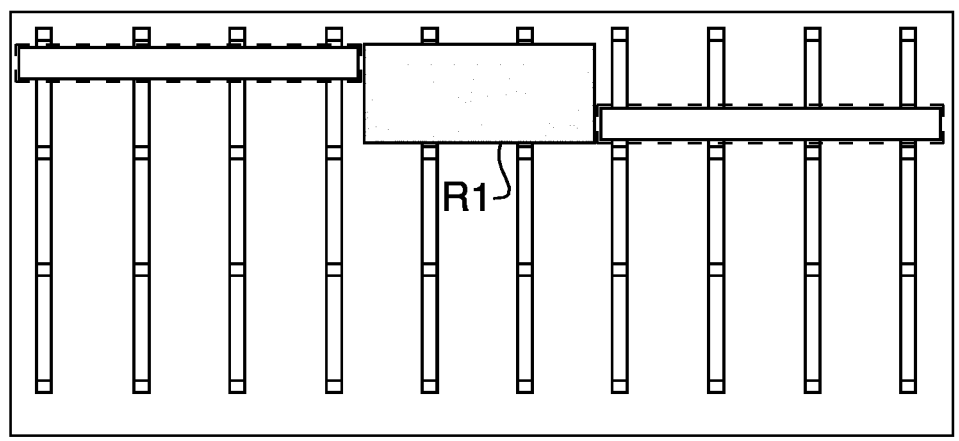
Figure 11C:
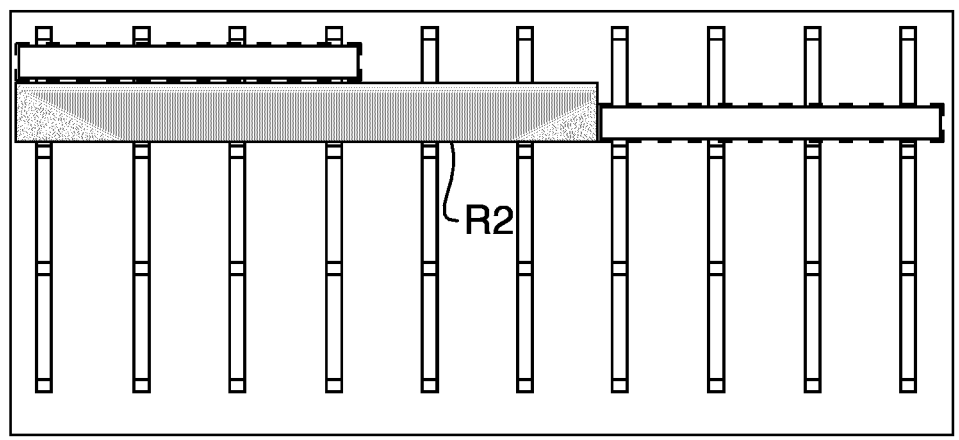

The exemplary rule set further prescribes a plurality of rules regarding (ii), namely:
in respect of each bundle placed upon the floor, said each bundle and any bundles stacked thereupon shall be centrally disposed with respect to a notional rectangular column having a length equal to the maximum length of the predetermined range of the bundle placed upon the floor and a width equal to the maximum width of the predetermined range of the bundle placed upon the floor
no notional rectangular column may be within a predetermined spacing distance of another
the bundles are placed such that all of the pipes are parallel to one another FIG. 5 shows the structure of FIG. 4 with the notional columns NC superimposed.

The actual placement of bundles on the floor is carried out to optimize the amount of space on the floor occupied by stacks.

In the exemplary method, as an initial step in this regard, in respect of each of a plurality of points regularly spaced from one another on the floor surface:
a first line is extended parallel to one of the dimensions from the point until such time as the line reaches the edge of the surface or a notional column, and thereafter is widened in directions parallel to the other dimension until such time as the first line reaches the edges of the surface or a notional column;
a first rectangle is defined by the perimeter of the first line and, if the length and width of the first rectangle are larger than the length and width of the type, the ratio of the area of the type to the ratio of the first rectangle is calculated;
a second line is extended parallel to the other of the dimension from the point until such time as the line reaches the edge of the surface or a notional column and thereafter is widened in directions parallel to the one dimension until such time as the line reaches the edge of the surface or a notional column; and
a second rectangle is defined by the perimeter of the second line and, if the length and width of the second rectangle are larger than the length and width of the type, the ratio of the area of the type to the ratio of the second rectangle is calculated.

FIGS. 7-8 and 9-10, respectively, show the progression of the definition of the first and second rectangles for sample point $P^s$. It will be appreciated that this same exercise will be repeated at each point P.

From the foregoing, the highest calculated ratio is selected, and the bundle is placed as follows:
in the event that only one of the calculations resulted in the selected ratio, the bundle is placed within that rectangle that resulted in the selected ratio; and
in the event that a plurality of the calculations resulted in the selected ratio, the bundle is placed within the rectangle that resulted in the selected ratio and is nearest a predetermined point, specifically, one corner of the warehouse.

Figure 12:
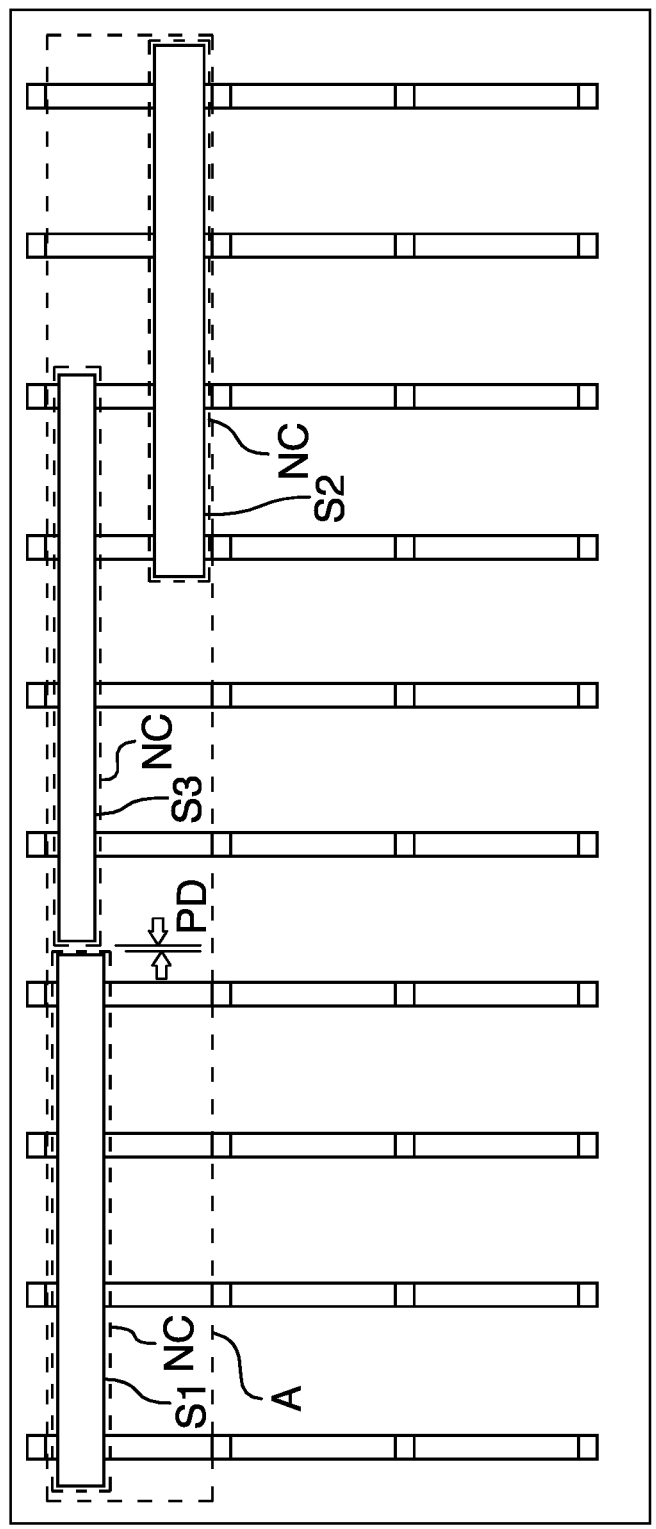
FIG. 12 shows a further bundle positioned in the structure of FIG. 4
Figure 13:
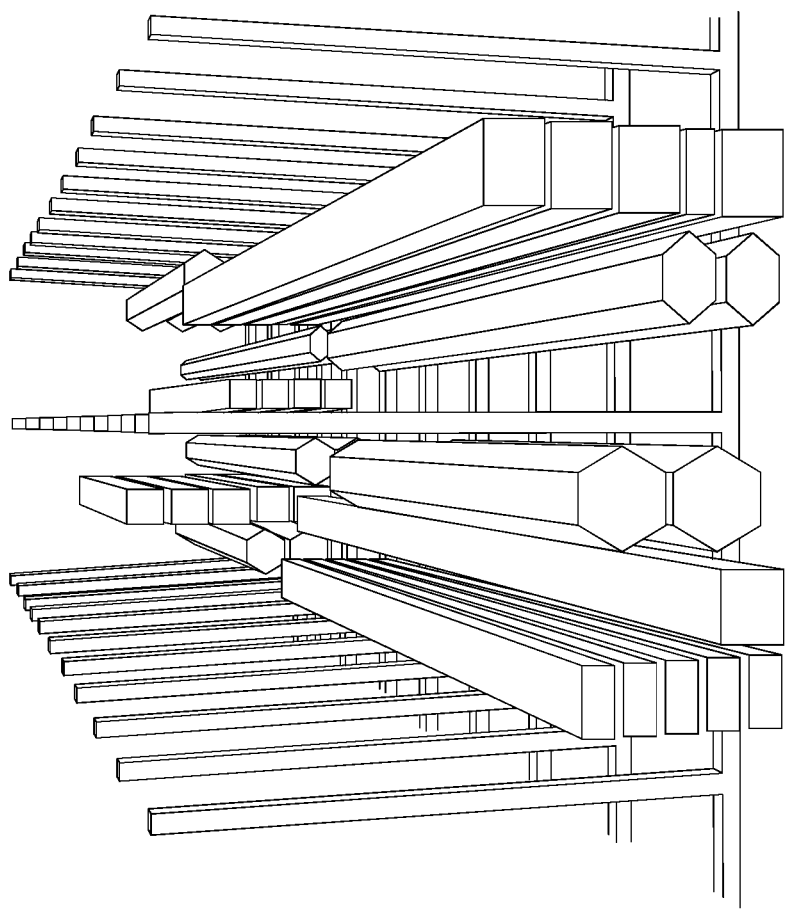
FIG. 13 is a perspective view showing a visualization of a storage area employing the method.

Thus, in the context of the warehouse shown in FIG. 5, a bundle of the type shown in FIG. 1 that could not otherwise be placed upon an existing stack without violation of the rule set would be placed in that of the three available rectangles R1, R2 and R3 which the bundle could fit within and most fully occupy. In the simplified example shown, rectangle R3 is slightly wider than R2 and of the same length; a bundle longer than the notional columns applicable in the case of stacks S1 and S2 would be placed in the corner of rectangle R3, as in FIG. 12. More particularly, a new stack S3 would be defined, occupying a new notional column NC, which would be placed nearest the upper, left corner of the floor space A and spaced predetermined distance D from the adjacent notional column. The predetermined distance is defined by, inter alia, the force of the magnet [if the stacks are too close to one another, magnetic attraction between the stack being moved and an adjacent stack may result in movement] and the size of the magnet [if the magnet is wider than a stack, the predetermined distance around the stack will need to be sufficient to ensure that the magnet can fit within adjacent stacks].

For greater clarity, it will be appreciated by persons of ordinary skill that the methodology mentioned hereinbefore results in placement of the bundle on the floor surface such that the open space surrounding the bundle is minimized without violation of the rule set, such space being defined, in respect of each possible position of the bundle, by that area of the floor surface lying between the notional rectangular column of the bundle and the largest rectangle that can be defined wholly on the floor surface that surrounds the bundle, does not intersect any other rectangular column and has dimensions parallel to those of the rectangular columns.

In the exemplary method, the positions P in respect of which the ratios are calculated are spaced apart lengthwise a distance equal to the nominal differential in lengths between bundle types and are spaced apart widthwise a distance equal to the width variance of each bundle.

Whereas the description makes specific mention of certain locations, and describes a specific embodiment and implementation, it should be understood that variations are possible.

For example, whereas a specific warehouse is illustrated in FIG. 3, it will be appreciated that this warehouse is exemplary, only.

Further, whereas the warehouse shown in FIG. 3 has a visible rectilinear floor surface, it will be appreciated that rectilinear floor surfaces can be found within floors having, for example, round or oval perimeters and the invention should be understood accordingly.

Further, whereas the exemplary method has been described with reference to a single floor surface A, the floor surface A shown will be seen to be one of a plurality available in the exemplary warehouse, each separated one from another by a row of columns C. It will be evident that, if no room exists in an existing floor space A, a new stack can be created in one of the other available floor spaces (bays).

Moreover, whereas in the exemplary embodiment, round bundles can be stacked upon shape bundles in certain situations, the rule set can prescribe that no round bundle can be stacked upon a shape bundle.

As well, whereas a specific selection of possible positions is used for the optimization step in the exemplary embodiment, the plurality of possible positions can be all possible positions, if advanced mathematical techniques are employed.

Further, whereas round bundles having a hexagon cross-section are discussed, other bundle cross-sections are possible.

Accordingly, the invention should be understood to be limited only by the accompanying claims, purposively construed.

The invention claimed is:

1. A system of pipes in a storage area having a rectilinear polygonal floor surface, comprising:
   a plurality of bundles of pipes, each bundle having a length, a width and a depth, each bundle comprising one of a shape bundle having a rectangular cross-section or a round bundle having a hexagonal cross-section;
   wherein each bundle is assigned to one of a plurality of types, each type having a predetermined length range and a predetermined width range, each bundle being assigned to that type for which the width of the bundle falls within the predetermined width range and for which the length of the bundle falls within the predetermined length range, and
   wherein the plurality of bundles is arranged in compliance with a rule set prescribing that
      no stack of bundles may exceed a predetermined height,
      no round bundle may have stacked thereupon a shape bundle,
      no round bundle may have stacked thereupon a round bundle of another type,
      the predetermined length range of each bundle in a stack is common,
      the predetermined width range of each shape bundle in a stack is common, and
      no stack may include a round bundle stacked upon a shape bundle wherein the predetermined width range of the round bundle is greater than the predetermined width range of the shape bundle.

2. A method of adding a further bundle of pipes to a plurality of bundles of pipes in a storage area having a rectilinear polygonal floor surface, each bundle having a length, a width, and a depth, each bundle comprising one of a shape bundle having a rectangular cross-section or a round bundle having a hexagonal cross-section, wherein each bundle is assigned to one of a plurality of types, each type having a predetermined length range and a predetermined width range, each bundle being assigned to that type for which the width of the bundle falls within the predetermined width range and for which the length of the bundle falls within the predetermined length range, the method comprising the steps of:
   arranging the plurality of bundles in compliance with a rule set prescribing that no stack of bundles may exceed a predetermined height, no round bundle may have stacked thereupon a shape bundle, no round bundle may have stacked thereupon a round bundle of another type, the predetermined length range of each bundle in a stack is common, the predetermined width range of each shape bundle in a stack is common, and no stack may include a round bundle stacked upon a shape bundle wherein the predetermined width range of the round bundle is greater than the predetermined width range of the shape bundle;
   assigning the further bundle to a type for which the width of the further bundle falls within a predetermined width range and for which the length of the further bundle falls within a predetermined length range;

responsive to determining that placing the further bundle on another bundle in the storage area would not result in a violation of the rule set, placing the further bundle on the another bundle; and responsive to determining that placing the further bundle on the another bundle would result in a violation of the rule set, placing the further bundle on the floor surface.

3. The method according to claim 2, wherein the rule set further prescribes that no stack can exceed a predetermined number of bundles.

4. The method according to claim 2, wherein the rule set further prescribes that no round bundle can be stacked upon a shape bundle.

5. The method according to claim 2, wherein the rule set further prescribes that bundles are placed such that all of the pipes are parallel to one another.

6. The method according to claim 2, wherein the rule set permits a round bundle to be stacked upon a shape bundle provided that at least a predetermined minimum number of round bundles of sharing a common type could be stacked upon the shape bundle without exceeding a predetermined height and no more than a predetermined maximum number of round bundles of sharing a common type could be stacked upon the shape bundle without exceeding the predetermined height.

7. The method according to claim 6, wherein the predetermined minimum number is two and the predetermined maximum number is three.

8. The method according to claim 6, further comprising, responsive to determining that a round bundle of a first type defined by a first predetermined length range and a first predetermined width range could be placed upon more than one stack without violation of the rule set, placing the round bundle, in descending order of preference:
    upon another round bundle of the first type;
    upon a shape bundle of the first type; and
    upon a shape bundle having the first predetermined length range and a predetermined width range lamer than the first predetermined width range.

9. The method according to claim 2, wherein the rule set further prescribes that, in respect of each bundle placed upon the floor surface, said each bundle and any bundles stacked thereupon shall be centrally disposed with respect to a notional rectangular column having a length equal to a maximum length of the predetermined length range of the bundle placed upon the floor surface and a width equal to a maximum width of the predetermined width range of the bundle placed upon the floor surface.

10. The method according to claim 9, wherein the rule set further prescribes that no notional rectangular column may be within a predetermined distance of another notional column.

11. The method according to claim 10, wherein the further bundle is placed upon the floor surface such that, for a plurality of positions on the floor surface in which the further bundle could be placed without violation of the rule set, the space surrounding the further bundle is minimized, such space being defined, in respect of each possible position of the bundle, by an area of the floor surface lying between the notional rectangular column of the further bundle and a largest rectangle that can be defined wholly on the floor surface that surrounds the further bundle, does not intersect any other notional rectangular column and has dimensions parallel to those of the notional rectangular columns.

12. The method according to claim 11, wherein the plurality of positions is all possible positions.

13. The method according to claim 11, wherein the plurality of positions is defined by a plurality of positions regularly spaced apart from one another.

14. The method according to claim 13, wherein the positions are spaced apart lengthwise a distance equal to a nominal differential in lengths between bundle types and are spaced apart widthwise a distance equal to a width variance of each bundle.

15. The method according to claim 11, wherein, with respect to each point of a plurality of points regularly spaced from one another on the floor surface, the method further comprises:
    extending a first line parallel to one dimension of a given notional rectangular column from the point until the first line reaches one of an edge of the floor surface or a notional rectangular column;
    widening the first line in directions parallel to another dimension of the given notional rectangular column until the first line reaches the edges of the floor surface or a notional rectangular column;
    defining a first rectangle by a perimeter of the first line;
    extending a second line parallel to the another dimension from the point until the second line reaches the edge of the floor surface or a notional rectangular column;
    widening the second line in directions parallel to the one dimension until the second line reaches one of the edge of the floor surface or a notional rectangular column;
    defining a second rectangle by a perimeter of the second line;
    calculating a first ratio, the first ratio defined as a ratio of an area of the type to an area of the first rectangle, responsive to a determination that the length and width of the first rectangle are larger than the length and width of the type;
    calculating a second ratio, the second ratio defined as a ratio of the area of the type to an area of the second rectangle, responsive to a determination that the length and width of the second rectangle are larger than the length and width of the type;
    determining a selected ratio by choosing the greater of the first ratio and the second ratio;
    responsive to a determination that only a single calculation of the first ratio and the second ratio resulted in the selected ratio, placing the further bundle within that rectangle that resulted in the selected ratio; and
    responsive to a determination that the selected ratio resulted from a plurality of calculations, placing the further bundle with the rectangle that resulted in the selected ratio and is nearest a predetermined point.

16. The method according to claim 15, wherein the further bundle is placed in a corner of the rectangle within which the further bundle is placed. The method according to claim 15, wherein the further bundle is placed.

17. An arrangement of a plurality of bundles of pipes in a storage area having a rectilinear polygonal floor surface, each bundle having a length, a width and a depth and being either a shape bundle having a rectangular cross-section or a round bundle having a hexagonal cross-section, the arrangement being characterized:
    in that each bundle is assigned to one of a plurality of types, each type having a predetermined length range and a predetermined width range, the bundle being assigned to that type in respect of which the width of the bundle falls within the predetermined width range and the length of the bundle falls within the predetermined length range; and by compliance with a rule set that prescribes that no stack of bundles may exceed a predetermined height;
no round bundle may have stacked thereupon a shape bundle;
no round bundle may have stacked thereupon a round bundle of another type;
the predetermined length range of each bundle in a stack is common;
the predetermined width range of each shape bundle in a stack is common; and
no stack may include a round bundle stacked upon a shape bundle wherein the predetermined width range of the round bundle is greater than the predetermined width range of the shape bundle.

18. A method for use with the arrangement and storage area of claim 17 and with a further bundle of pipes of the type having a length, a width and a depth and being either a shape bundle having a rectangular cross-section or a round bundle having a hexagonal cross-section, the method comprising the steps of:
assigning the bundle to that type in respect of which the width of the bundle falls within the predetermined width range and the length of the bundle falls within the predetermined length range; and
placing the bundle: (i) on another bundle in the storage area, if placement would not result in a violation of a rule set; or (ii) on the floor surface, if placement would otherwise result in a violation of the rule set.

19. A method according to claim 18, wherein the rule set further prescribes that, in respect of each bundle placed upon the floor, said each bundle and any bundles stacked thereupon shall be centrally disposed with respect to a notional rectangular column having a length equal to the maximum length of the predetermined range of the bundle placed upon the floor and a width equal to the maximum width of the predetermined range of the bundle placed upon the floor.

20. A method according to claim 19, wherein the rule set further prescribes that no notional rectangular column may be within a predetermined distance of another notional column.

21. A method according to claim 20, wherein the bundle is placed upon the floor surface such that, of a plurality of possible positions on the floor surface wherein the bundle could be placed without violation of the rule set, the space surrounding the bundle is minimized, such space being defined, in respect of each possible position of the bundle, by that area of the floor surface lying between the notional rectangular column of the bundle and the largest rectangle that can be defined wholly on the floor surface that surrounds the bundle, does not intersect any other rectangular column and has dimensions parallel to those of the rectangular columns.

22. A method according to claim 21, wherein:
in respect of each point of a plurality of points regularly spaced from one another on the floor surface,
a first line is extended parallel to one dimension from the point until such time as the first line reaches an edge of the floor surface or a notional column;
the first line is widened in directions parallel to another dimension until such time as the first line reaches the edges of the floor surface or a notional column;
a first rectangle is defined by a perimeter of the first line;
a second line is extended parallel to the another dimension from the point until such time as the second line reaches the edge of the floor surface or a notional column;
the second line is widened in directions parallel to the one dimension until such time as the second line reaches the edge of the floor surface or a notional column;
a second rectangle is defined by a perimeter of the second line;
if the length and width of the first rectangle are larger than the length and width of the type, the ratio of the area of the type to the ratio of the first rectangle is calculated;
if the length and width of the second rectangle are larger than the length and width of the type, the ratio of the area of the type to the ratio of the second rectangle is calculated;
the highest calculated ratio is selected; and
in the event that (i) only one of the calculations resulted in the selected ratio, the bundle is placed within that rectangle that resulted in the selected ratio; and (ii) a plurality of the calculations resulted in the selected ratio, the bundle is placed within the rectangle that resulted in the selected ratio and is nearest a predetermined point.

* * * * *